United States Patent
Srivastava

(10) Patent No.: US 7,797,180 B2
(45) Date of Patent: Sep. 14, 2010

(54) METHOD AND SYSTEM FOR COMPARING POPULATIONS OF ENTITIES TO MAKE PREDICTIONS ABOUT BUSINESS LOCATIONS

(75) Inventor: Ashok N. Srivastava, Mountain View, CA (US)

(73) Assignee: Saama Technologies, Inc., Campbell, CA (US)

( * ) Notice: Subject to any disclaimer, the term of this patent is extended or adjusted under 35 U.S.C. 154(b) by 314 days.

(21) Appl. No.: 11/960,388

(22) Filed: Dec. 19, 2007

(65) Prior Publication Data

US 2009/0164420 A1     Jun. 25, 2009

(51) Int. Cl.
*G06F 17/00* (2006.01)
(52) U.S. Cl. ......................................................... 705/7
(58) Field of Classification Search ....................... 705/7
See application file for complete search history.

(56) References Cited

U.S. PATENT DOCUMENTS

2002/0152092 A1 * 10/2002 Bibas et al. .................... 705/1

OTHER PUBLICATIONS

Giovis, Jaclyn; Finding your place; Jun. 19, 2006; Knight-Ridder Tribune Business News—Sun-Sentinel-Fort Laude; dialog copy.*

* cited by examiner

*Primary Examiner*—Thomas Dixon

(74) *Attorney, Agent, or Firm*—Kevin H. Fortin

(57) ABSTRACT

A method and system including software makes predictions about potential business locations. The method includes the steps of providing heterogeneous data including a spatial component, extracting entities from the heterogeneous data, clustering the entities, and making a prediction about the business location using the clustered entities. Entities preferably include stores, people, or other physical objects and each has attributes. Preferably the entities include at least one of the following attributes: Value Ratio, Focal Values, Impact, Revenue Difference, Support, and Baseline Value. In this way, predictions made about the business locations will account for the nature of the business and enable comparison of one business location to another.

11 Claims, 2 Drawing Sheets

METHOD AND SYSTEM FOR COMPARING POPULATIONS OF ENTITIES TO MAKE PREDICTIONS ABOUT BUSINESS LOCATIONS

FIELD OF THE INVENTION

The present invention relates to methods and systems for making predictions about business locations.

BACKGROUND OF THE INVENTION

Success in business depends on multiple factors. In the case of retail businesses, one of the most important factors is location. An optimal location will have favorable traffic flow, adequate parking, competitive cost, an inviting appearance, as well as suitable customer demographics and spending patterns. Location of competitors and the location of anchor businesses (i.e. nearby businesses that attract customers that would be also suitable for one's own business) are additional considerations. Barriers, including barriers to traffic flow and zoning restrictions, are further considerations. There are many more considerations, depending on the nature of the business.

Success is in business may be measured by earnings, profitability, increases in total value, increases in membership (particular for non-profit businesses), and sometimes increased exposure in a target market is a legitimate measure of business success.

Currently, some companies primarily rely upon human insight and experience to predict business performance for proposed business locations. Others recognize that there is added value in analyzing the multitude of data available that could be used to support a decision-maker. Unfortunately, available data is often too difficult for an individual to readily assimilate and fully comprehend. In some instances, complex data relationships that can optimize business location selection are undetectable when raw and non-homogeneous data is viewed with human eyes. In other instances, statistical methods may fail to yield information that directly relates to predicting business success.

It is desirable for complex relationships to be extracted from non-homogeneous data and used to assist a decision-maker in choosing an optimal business location and for making predictions about business locations. It is also desirable that such complex relationships can be presented in view of particular business goals.

SUMMARY OF THE INVENTION

The present invention includes a method for making predictions about business locations by using any of a number of heterogeneous data sources. The data sources have data including a spatial component that correlates to a business location. The methods of the present invention are preferably implemented by a system including software.

The method includes extracting entities from the heterogeneous data. The step of extracting entities employs clustering so that the extracted entities are useful in making predictions about a business location. Examples of entities include locations, stores, people, or other physical objects. The entities have some attributes that include raw data and functions of raw data. The attributes can also include particular functions of raw data so that the functions are directly useful in predicting business success.

The step of extracting includes profiling of the data to yield entities for a given location. Preferably, profiling results in the calculation of entity attributes chosen from at least one of: Value Ratio, Focal Values, Impact, Revenue Difference, Support, and Baseline Value. These entities are useful for comparing predictions about one business location with predictions made about another business location.

The step of clustering reduces the dimensionality problem associated with utilizing large data sets. Clustering, in accordance with one aspect of the invention, employs a k-means algorithm, a fuzzy c-means algorithm, an expectation maximization algorithm, spectral clustering, or principal components analysis. Clustering helps to find complex relationships in the data that would not otherwise be readily apparent by viewing raw data, or by using only statistical methods.

The methods of the present invention are implement by software, or hardware, on a network or by a single machine. Accordingly, software in accordance with the present invention includes resources necessary to implement the inventive methods described herein, and others. The resources include: a selection resource for selecting possible business locations, an accessing resource for accessing data pertaining to the possible business locations, an extracting resource for extracting entities from the data, a clustering resource for clustering a portion of the entities and forming populations of entities, and a prediction resource for using the populations of entities to make a prediction about the possible business locations. The invention also includes an interface resource for interacting with an analyst or user.

BRIEF DESCRIPTION OF THE DRAWINGS

The invention may be better understood with reference to the detailed description in conjunction with the following figures where like numerals denote like elements, and in which.

DETAILED DESCRIPTION

The present invention compares populations of entities and uses statistical measures to predict values indicative of business success for any of a number of particular business locations. This invention assists business decision-makers in quickly assessing the relative value of each possible business location, in view of a particular business.

"Entities" are the variables that are at least partially describable by data. Specific examples of entities include locations, stores, people, or other physical objects. Entities have attributes that are characterized by raw data or functions of the raw data. The appropriate entities are pre-determined according to one aspect of the invention. According to an alternate aspect of the invention, the entities required to make a prediction about a particular business location are learned from available data through machine learning.

Each entity includes a spatial component, or at least can be correlated with a particular location. For example, a state, zip code or a direct marketing area, are examples of spatial components. An entity spatial component may also be narrowly defined, for example, a street, a block on a street, or a particular address.

A population of entities is a conglomeration of entities for a given possible business location. The comparison of populations entities is done using various entity attributes including lease rates, occupancy rates, traffic flow rates, visibility, demographic variables, competitive business intelligence, or functions or combinations of variables. Other examples of attributes of entities include: Value Ratio, Focal Values, Impact, Revenue Difference, Support, and Baseline Value.

The invention enables the comparison of the population of entities from a first location with a population of entities from a number of pre-selected alternate locations. According to another aspect of the invention, the populations of entities from a set of possible locations can be automatically identified by the software and mapped against each other and valuated so that a subset of possible locations can be readily present to, and compared by, the software or an analyst.

Figure 1:
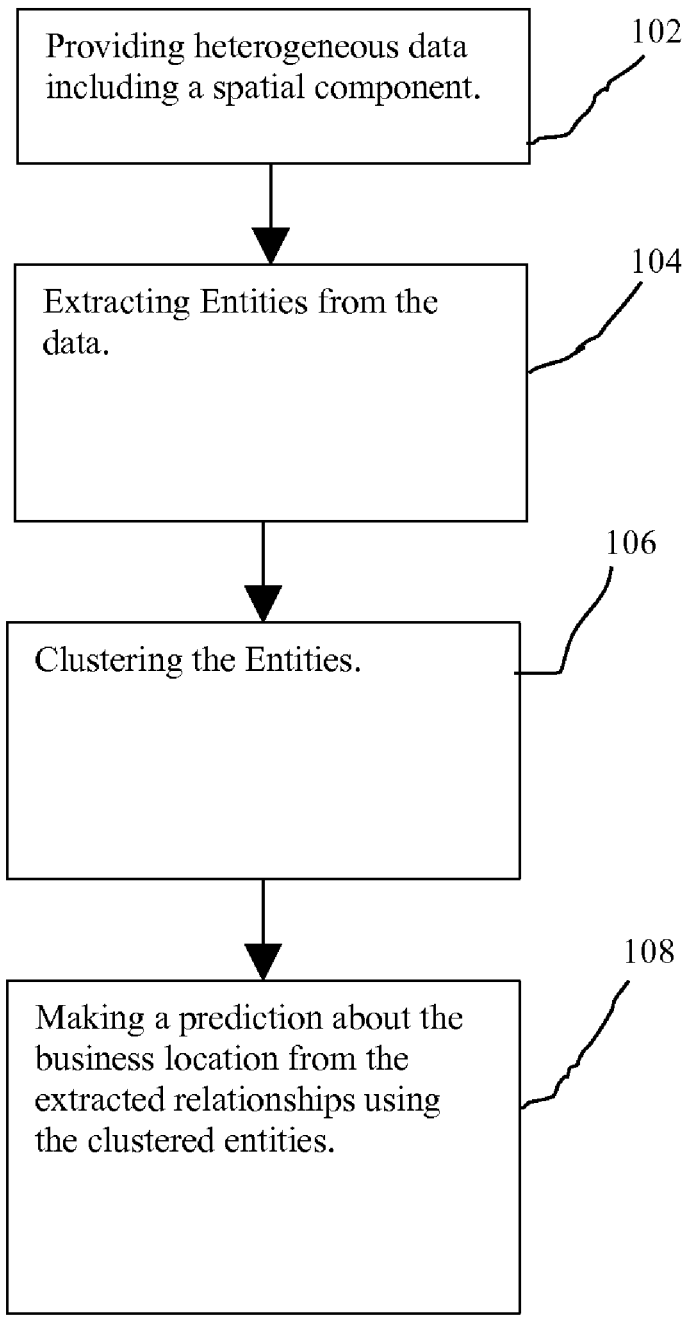
FIG. 1 is a flow chart showing a methods in accordance with the present invention.

FIG. 1 shows a method 100 in accordance with the invention including the step 102 of providing heterogeneous data including a spatial component, the step 104 of extracting entities from the heterogeneous data, the step 106 of clustering entities, and the step 108 of making a prediction about a business location. Preferably the step 102 of providing heterogeneous data includes accessing commercially available data via a communications network.

In general, measures of business success include profitability. The step 108 of making predictions specifically relates to predicting an aspect of likely profitability for a predetermined business at the particular business location. The particular location may be any spatial component related to the business including a particular location, region, zip code, direct marketing area, or other indicator of a set of locations. The measure of profitability is preferably predetermined. Accordingly, profitability can be expressed on a per customer basis, on a per capita basis, or can include profitability for a given time period. In cases where businesses need time to mature to profitability, the relevant business metric may rely upon revenue, or a function of a revenue stream. Accordingly, value in terms of any particular business metric can be attributed to a population of entities, wherein the value can be compared with a corresponding value of another populations of entities.

The step 104 of extracting entities preferably uses profiling of the data to create various entities, which are functions of raw data. The profiled entities are readily comparable between business locations, even where the underlying data is non-homogeneous. Examples of entities resulting from the step 104 of extracting include: Value Ratio, Focal Values, Impact, Revenue Difference, Support, and Baseline Value. These entities are some that are compared to corresponding entities from other locations and thus enable the comparison of populations of entities.

The step 104 of extracting entities preferably relies on identification of focal segment. A focal segment is a portion of a current customer base in proximity to a business location, about which a user or analyst may desire to determine the characteristics. Each focal segment correlates to at least some measure of business success. This pre-defined focal segment, according to one aspect of the invention maps directly with a matching focal segment from another population of entities. Examples of focal segments include customers within a two mile radius from a store location that buy black clothes, customers that are married, or customers with high home equities. According to one aspect of the invention, important focal segments are pre-determined, depending on the nature of the particular business. Machine learning is used in accordance with another aspect of the invention to determine which focal segment is useful, and to attribute a focal value for that particular focal segment.

The step 104 of extracting entities calculates focal values. The focal value is the value of the focal segment and is calculated as follows: For boolean fields, the focal value is the percentage of members of the focal segment that satisfy a field description. For the numeric fields, the focal value is calculated by determining the average value of the field description for the specified focal segment members.

By knowing the focal value, an analyst is able to determine the worth of the particular segment to his or her business. A high focal value may mean that the particular segment is valuable to the analyst's business and is "positively-enriched." For example, a focal value of 95% for a boolean field such as "Married" means that the focal segment contains 95% married people. A low focal value could mean that the segment contains a negative-enrichment in the focal segment.

The step 104 of extracting preferably calculates the value ratio. The value ratio of a focal segment is determinable by calculating the ratio of the field value for the focal segment to the field value for the baseline segment. By knowing the value ratio, the analyst is able to determine the relative worth of different segments of the customer base.

The step 104 of extracting entities calculates the revenue difference. The revenue difference is calculated for any desired focal segment. The revenue difference for a boolean field is calculated by determining the difference between what a typical population within the field spends within the focal segment and what the typical focal segment member spends within the focal segment.

For a revenue or numeric field, the revenue difference is determined by calculating the average revenue spent on the field by the focal segment members minus the revenue spent on the field by baseline segment members. The revenue difference calculation allows the analyst to quickly determine how much more or less is spent by a person in the focal segment than is spent by the baseline population. Higher revenue differences may indicate a greater disparity in spending between the compared groups.

The step 104 of extracting entities calculates the impact of a chosen focal segment: For a boolean field, the impact is calculated by determining the revenue difference per person between the focal segment and the baseline segment and multiplying it by the number of field members in the entire customer base. This number is then divided by the total revenue for all of the customers. The impact is the percentage of all revenue that is attributable to the relationship between the field and the focal segment. Thus, a large impact demonstrates to the analyst that the cluster or group possesses a large effect on the revenue stream of the business.

The step 104 preferably calculates support for a chosen focal segment. For boolean fields, the support is calculated by determining the percentage of the entire customer base that is both in the focal segment and has a field descriptor of a particular value. The support calculation allows the analyst to quickly determine the relative size of the focal segment. A higher support may indicate that the particular value for the field descriptor is prevalent in the database and is therefore more statistically significant.

The step 104 preferably calculates the baseline value of the focal segment. The baseline value of the focal segment for a boolean field may be determined by calculating the percentage of members of the baseline segment which possess a field descriptor of a particular value. For the revenue or other numeric fields, the baseline value is the average value of the field descriptor for the baseline segment members. The baseline value determination allows the analyst to quickly determine the value of the focal segment. However, other definitions for the baseline valuations may also be employed. For instance, for revenue or other numeric fields, the baseline value could be any function of the population contained in the focal segment, such as its variance, minimum, or maximum.

The baseline segment is alterable by an analyst. In this way, different clusters may rapidly be compared to one another by changing the baseline segment from the entire customer base to a particular segment of the customer base. The present invention also allows the focal segment to be altered. In this way, different clusters may be rapidly compared to the current baseline segment.

The step 106 of clustering in accordance with the present invention enables an analyst or software to automatically create entity clusters. Various clustering algorithms and computational methods may be used, the selection of particular algorithms and computational methods depends, in part, on the available data.

K-means algorithm: In accordance with one aspect of the invention, the K-means algorithm is used to automatically create clusters. Some advantages of the K-means algorithm are its simplicity and speed which allows it to run on large data sets.

The K-means algorithm assigns each point to the cluster whose center (also called centroid) is nearest. The center is the average of all the points in the cluster. Its coordinates are the arithmetic mean for each dimension separately over all the points in the cluster.

Example: The data set has three dimensions and the cluster has two points: $X=(x1, x2, x3)$ and $Y=(y1, y2, y3)$. Then the centroid Z becomes $Z=(z1, z2, z3)$, where $z1=(x1+y1)/2$ and $z2=(x2+y2)/2$ and $z3=(x3+y3)/2$.

The algorithm steps include choosing the number of clusters, k; randomly generating k clusters and determine the cluster centers, or directly generating k random points as cluster centers; assigning each point to the nearest cluster center; recomputing the new cluster centers; and repeating the two previous steps until some convergence criterion is met. The k-means clustering techniques are particularly useful for tabular data.

In accordance with another aspect of the invention fuzzy c-means algorithm is used. In fuzzy c-means clustering, each point has a degree of belonging to clusters, as in fuzzy logic, rather than belonging completely to just one cluster. The algorithm minimizes intra-cluster variance.

Thus, points on the edge of a cluster, may be in the cluster to a lesser degree than points in the center of cluster. For each point x we have a coefficient giving the degree of being in the $k^{th}$ cluster $uk(x)$. Usually, the sum of those coefficients is defined to be 1. With fuzzy c-means, the centroid of a cluster is the mean of all points, weighted by their degree of belonging to the cluster. The degree of belonging is related to the inverse of the distance to the cluster then the coefficients are normalized and fuzzy field with a real parameter m>1 so that their sum is 1. So for m equal to 2, this is equivalent to normalizing the coefficient linearly to make their sum 1. When m is close to 1, then cluster center closest to the point is given much more weight than the others, and the algorithm is similar to k-means.

Fuzzy c-means algorithm: The fuzzy c-means algorithm includes the steps of choosing a number of clusters; assigning randomly to each point coefficients for being in the clusters; repeating until the algorithm has converged (that is, the coefficients' change between two iterations is no more than any given sensitivity threshold); computing the centroid for each cluster, using the formula above; and for each point, computing its coefficients of being in the clusters, using the formula above.

Expectation maximization algorithm: In accordance with one aspect of the invention, a variant of fuzzy c-means clustering known as the expectation maximization (EM) algorithm is used for tabular data. The EM algorithm is used to find maximum likelihood estimates of parameters in probabilistic models, such as, for example, where the model depends on unobserved latent variables. EM alternates between performing an expectation (E) step, which computes an expectation of the likelihood by including the latent variables as if they were observed, and a maximization (M) step, which computes the maximum likelihood estimates of the parameters by maximizing the expected likelihood found on the E step. The parameters found on the M step are then used to begin another E step, and the process is repeated.

It can be appreciated that other clustering methods such as hierarchical clustering or neural network clustering are useful to automatically create clusters. These automatically-created clusters further provide the analyst additional clusters of customers to explore. The automated clustering provides the advantage of allowing the analyst to quickly determine strategies or relationships that might not have been obvious to the analyst using standard groupings as clusters.

Principal components analysis (PCA) is a clustering algorithm that is used with both tabulated data and with textual data in accordance with the present invention. PCA is particularly useful for making predictive models that enable selection of a business location. PCA involves the calculation of the eigenvalue decomposition or singular value decomposition of a data set, usually after mean centering the data for each attribute. The results of a PCA are characterized in terms of component scores and loadings.

PCA is mathematically defined as an orthogonal linear transformation. PCA transforms the data to a new coordinate system such that the greatest variance by any projection of the data comes to lie on the first coordinate, or first principal component. The second greatest variance comes to lie on the second coordinate, and so on. PCA is theoretically the optimum transform for given data in least square terms.

PCA can be used for dimensionality reduction in a data set by retaining those characteristics of the data set that contribute most to its variance by keeping lower-order principal components and ignoring higher-order ones. Such low-order components often contain the most important aspects of the data, which an analyst would be most likely to use in making predictions about business locations.

While PCA is employed in accordance with one aspect of the invention, it can be appreciated that other transformation methods that transform data to a new coordinate system can be used that reduces the dimensionality problem of voluminous data and enables a fair comparison of data between heterogeneous data sources so that predictions about business locations can be made.

Spectral clustering is also useful in accordance with the present invention, depending on the data used. Spectral clustering techniques make use of the spectrum of the similarity matrix of the data to perform dimensionality reduction for clustering in fewer dimensions.

Figure 2:
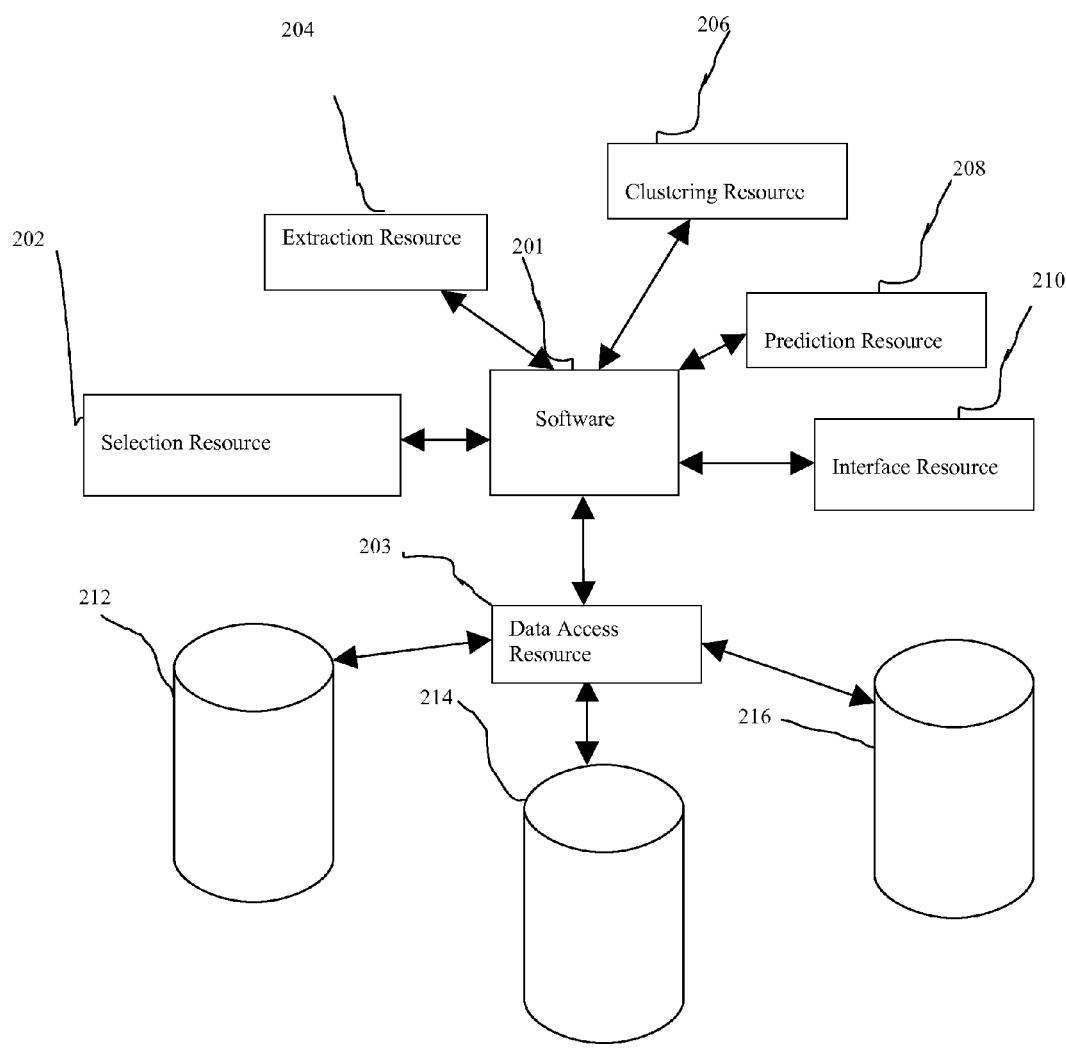
FIG. 2 is a flow chart showing software in accordance with the present invention.

FIG. 2 shows system 200 in accordance with the present invention. The system 200 includes software 201 for analyzing data. The system 200 includes various resources integrated in active communication with the software 201 including a selecting resource 202 for selecting possible business locations and a data access resource 203 for accessing data pertaining to the possible business locations, and an extracting resource 204 for extracting entities from the data, a clustering resource 206 for clustering entities and forming a population of entities, a prediction resource 208 for making predictions about business locations by relying on the extracted entities, the clustered entities and the comparison of populations of entities. The system 200 also includes an interface resource 210 for enabling input and output for the benefit of an analyst or other user.

The software 201 executes the methods of the present invention, including the step 102 of providing heterogeneous data including a spatial component, the step 104 of extracting entities from the heterogeneous data, the step 106 of clustering entities, and the step 108 of making a prediction about a business location, which are each described with respect to FIG. 1.

The system 200 includes numerous data sources, including data sources 212, 214 and 216. The data sources 212, 214 and 216 are accessible via a communications network in accordance with one aspect of the invention. In accordance with another aspect of the invention, the data sources are stored and accessed locally. The data sources 212, 214 and 216 are heterogeneous data source in accordance with one aspect of the invention. It can be appreciated that homogeneous data sources can also be used directly in accordance with the present invention, or created from heterogeneous data source in accordance with the invention.

While the present invention describes using a predetermined set of possible business locations to analyze, it can be appreciated at using decision tree methods can automate the selection of the set of possible business locations. Decision tree algorithms are particularly useful for automatically pre-selecting a set of possible business locations. Decision tree analysis is optimally used when training data is available.

It can be appreciated that the term "business" should be broadly construed to include churches, hospitals, real estate investments, restaurants, schools, entertainment, fitness and sports facilitates, and other for-profit and non-profit business. Additionally, the field of data mining is able to provide numerous solutions to analyzing data, so the techniques described herein should be construed to include a variety of ways to analyze the data and to utilize machine learning. The invention is also particularly useful for real-estate investors to determine future values of possible investment properties.

The invention claimed is:

1. A method for making and displaying predictions about a business location, comprising the steps of:
   providing, from a data source, heterogeneous data including a spatial component and an interface resource, the interface resource being hardware, for enabling output of the predictions;
   extracting entities from the heterogeneous data;
   clustering the entities to form a population of entities; and
   making and displaying a prediction about the business location using the population of entities.

2. A method as set forth in claim 1, wherein the step of extracting includes profiling of the heterogeneous data to yield entities for the business location.

3. A method as set forth in claim 2, wherein profiling of the heterogeneous data includes calculating entity attributes chosen from at least one of: Value Ratio, Focal Values, Impact, Revenue Difference, Support, and Baseline Value.

4. A method as set forth in claim 2, further comprising: comparing the prediction about the business location with a prediction made for another business location, wherein the step of comparing directly compares the profiled entities of one location with the profiled entities made for another location.

5. A method as set forth in claim 1, wherein the entities have attributes characterized by data points and the step of clustering employs a k-means algorithm.

6. A method as set forth in claim 5, wherein the step of clustering includes: choosing the number of clusters k;
   randomly generating k clusters and determining k cluster centers;
   assigning each data point to the nearest cluster center;
   recomputing new cluster centers; and
   repeating the steps of determining and assigning.

7. A method as set forth in claim 5, wherein the step of clustering data points includes:
   choosing the number of clusters, k;
   directly generating k random points as cluster centers;
   assigning each data point to the nearest cluster center;
   recomputing new cluster centers; and
   repeating the steps of determining and assigning.

8. A method as set forth in claim 1, wherein the step of clustering employs an expectation maximization algorithm.

9. A method as set forth in claim 1, wherein the step of clustering employs spectral clustering.

10. A method as set forth in claim 1, wherein the step of clustering employs principal components analysis.

11. A method as set forth in claim 1, wherein the step of comparing compares a population of entities from the business location with a population of entities from another business location.

* * * * *